United States Patent
Geyer et al.

(10) Patent No.: US 11,079,610 B2
(45) Date of Patent: Aug. 3, 2021

(54) EYEGLASSES

(71) Applicant: Pocket Sky OG, Vienna (AT)

(72) Inventors: Michael Geyer, Vienna (AT); Mark Wallerberger, Vienna (AT)

(*) Notice: Subject to any disclaimer, the term of this patent is extended or adjusted under 35 U.S.C. 154(b) by 124 days.

(21) Appl. No.: 16/491,424

(22) PCT Filed: Mar. 7, 2018

(86) PCT No.: PCT/EP2018/055630
§ 371 (c)(1),
(2) Date: Sep. 5, 2019

(87) PCT Pub. No.: WO2018/162567
PCT Pub. Date: Sep. 13, 2018

(65) Prior Publication Data
US 2020/0033631 A1    Jan. 30, 2020

(30) Foreign Application Priority Data

Mar. 9, 2017  (AT) ............................... A 50184/2017

(51) Int. Cl.
*G02C 5/22*    (2006.01)
*G02C 5/18*    (2006.01)

(52) U.S. Cl.
CPC ............. *G02C 5/2272* (2013.01); *G02C 5/18* (2013.01); *G02C 5/229* (2013.01); *G02C 5/2209* (2013.01); *G02C 5/2254* (2013.01)

(58) Field of Classification Search
CPC ...... G02C 5/2272; G02C 5/18; G02C 5/2209; G02C 5/2254; G02C 5/229
USPC ....................................................... 351/153
See application file for complete search history.

(56) References Cited

U.S. PATENT DOCUMENTS

| | | | | |
|---|---|---|---|---|
| 5,000,558 A | * | 3/1991 | Blackstone | G02C 5/00 2/439 |
| 2005/0275795 A1 | | 12/2005 | Jobin et al. | |
| 2014/0197167 A1 | * | 7/2014 | Gast | B65D 11/18 220/4.29 |
| 2016/0266402 A1 | | 9/2016 | Gochenour et al. | |

FOREIGN PATENT DOCUMENTS

| | | |
|---|---|---|
| DE | 8527033 U1 | 8/1987 |
| DE | 102004027013 A1 | 12/2005 |
| DE | 202016002203 U1 | 8/2016 |
| EP | 2226672 A1 | 9/2010 |
| EP | 3118670 A1 | 1/2017 |

* cited by examiner

*Primary Examiner* — George G King
(74) *Attorney, Agent, or Firm* — David Guerra

(57) ABSTRACT

Spectacle having two temples which are each articulated via a pivot connection to an optical central section which covers the field of vision in the position of use and can be pivoted from a storage state, in which the temples are applied to the optical central section, to an operating state, in which the temples are folded out from the central section, the optical central section being manufactured from a flexurally elastic material. The two temples are each articulated to the central section via a curved pivot axis of the pivot connection or via at least two linear pivot axes of the pivot connection arranged transversely to one another. In this way, glasses can be produced in which, in the position of use, light entering laterally, which does not cross the optical central section but nevertheless reaches the eye of the wearer, is largely suppressed.

17 Claims, 10 Drawing Sheets

Fig. 6a
Fig. 6b
Fig. 6c
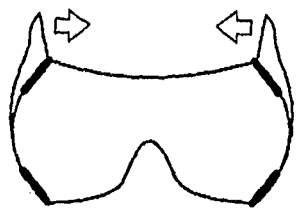
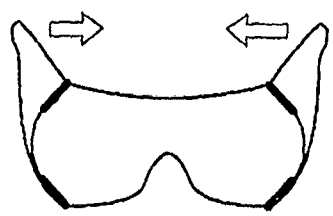
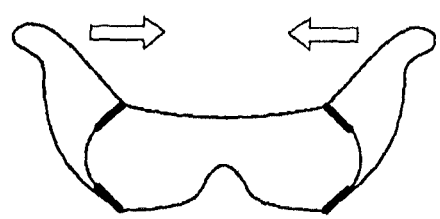
Fig. 7
Fig. 8
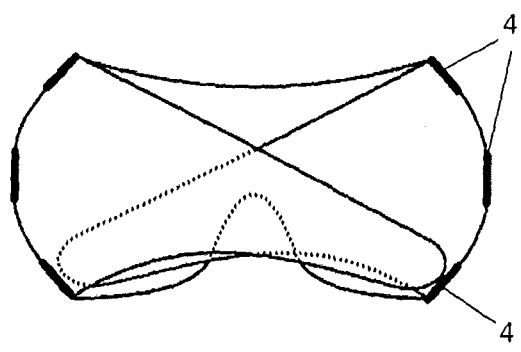
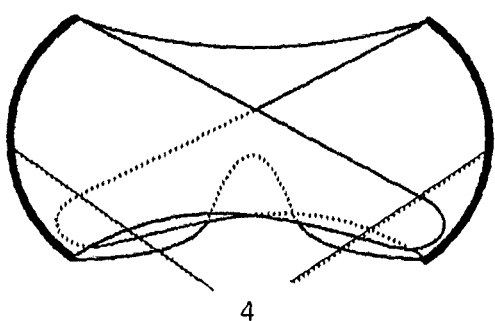
Fig. 9
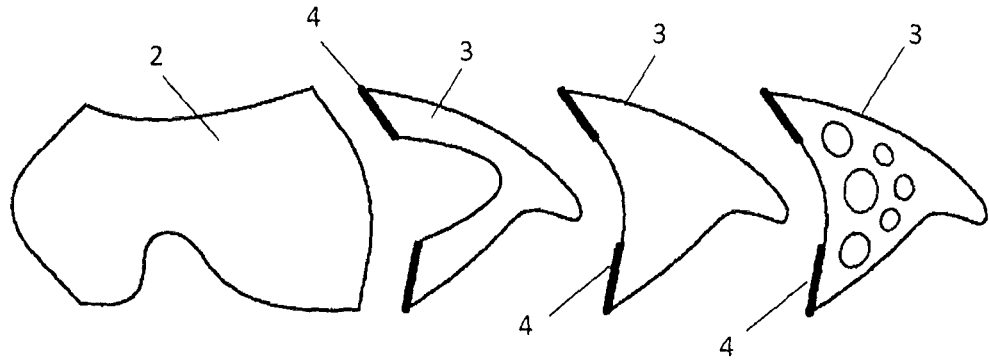

EYEGLASSES

CROSS-REFERENCE TO RELATED APPLICATION

This application is an U.S. national phase application under 35 U.S.C. § 371 based upon International Application No. PCT/EP2018/055630 filed on Mar. 7, 2018. Additionally, this U.S. national phase application claims the benefit of priority of International Application No. PCT/EP2018/055630 filed on Mar. 7, 2018 and Austria Application No. A 50184/2017 filed on Mar. 9, 2017. The entire disclosures of the prior applications are incorporated herein by reference. The international application was published on Sep. 13, 2018 under Publication No. WO 2018/162,567 A1.

BACKGROUND

Technical Field

The present technology concerns spectacles with two temples, each of which is hinged via a pivot connection to an optical central section covering the field of vision in the position of use and which can be pivoted from a storage state, in which the temples are applied to the optical central section, to an operating state, in which the temples are folded out from the central section, wherein the optical central section is made of a flexible material, according to the general term of claim 1.

Background Description

Spectacles of this type having an optical central section made of a flexible elastic material serve, for example, to reduce the overall intensity of the light radiating into the eye of the wearer or to reduce it with respect to selected frequency ranges. Examples are sunglasses or yellow filter glasses. For the production of the optical central section, which covers the field of vision in the position of use, special synthetic materials are known which weaken light in the ultraviolet frequency range as in sunglasses, or in the blue frequency range as in yellow filter glasses in order to influence the melatonin balance of the body and which are flexible. Flexible here means that the corresponding material is flexible but not stretchable when handled manually, and returns elastically to its original state in a load-free state. Furthermore, spectacles are known in which the right and left field of vision of the optical central section have different filter properties for displaying three-dimensional images and which are thus also referred to as 3D glasses. These spectacles are also made of plastics with corresponding optical properties, which are usually flexible.

Especially if a protective effect is to be achieved, the optical central section must be placed as close as possible to the face so that the distance between the edge of the spectacles and the skin surface is kept as small as possible. In this way, amount of light entering from the side, which does not cross the optical central section but nevertheless reaches the wearer's eye, can be reduced. In addition, a mechanical barrier can be created between the eye area and the environment to provide additional protection from dust, sand, splashes, etc. However, there are limits to this in practical use, for example when the wearer must wear spectacles to correct defective vision and also wear yellow filter glasses or 3D glasses. In order to reduce amount of light entering from the side, we also know of designs in which a frame section of the optical center section essentially protrudes vertically from the optically active surface of the spectacles and, in the position of use, extends to the face of the wearer. However, these designs are bulky and unwieldy in practical use and are comparatively expensive to manufacture.

BRIEF SUMMARY OF THE PRESENT TECHNOLOGY

In view of the foregoing disadvantages inherent in the known types of spectacles, the present technology provides novel spectacles, and overcomes above-mentioned disadvantages and drawbacks of the prior art. As such, the general purpose of the present technology, which will be described subsequently in greater detail, is to provide new and novel spectacles and method which has all advantages of the prior art mentioned heretofore and many novel features that result in spectacles which is not anticipated, rendered obvious, suggested, or even implied by the prior art, either alone or in any combination thereof.

It is therefore aim of the present technology to realize spectacles in which, in the position of use, light entering laterally, which does not cross the optical central section but nevertheless reaches the eye of the wearer, is largely suppressed. The spectacles should be practical to handle and inexpensive to manufacture.

According to one aspect of the present technology, the present technology can include a spectacle comprising two temples which can be each articulated by way of a pivot connection to an optical central section which covers a field of vision in a position of use and is pivotable from a storage state, in which the temples can be applied to the optical central section, into a state of use, in which the temples are folded out from the central section. The optical central section can be a flexible material. The two temples can be in each case articulated to the central section by way of at least one curved pivot axis of the pivot connection or in each case by way of at least two linear pivot axes of the pivot connection arranged transversely to one another. The optical central section can assume a state which is dependent on a pivot angle of the temples when the temples are pivoted out and is increasingly curved as the pivot angle increases.

According to another aspect, the present technology can relate to spectacles with two temples, each of which is hinged via a pivoting connection to an optical central section covering the field of vision in the position of use and which can be pivoted from a storage state, in which the temples are applied to the optical central section, to an operating state, in which the temples are folded out from the central section, wherein the optical central section is made of a flexible material. In accordance with the present technology, it is provided that the two temples are each articulated to the central section via at least one curved pivot axis of the pivot connection or via at least two straight pivot axes of the pivot connection arranged transversely to one another, wherein the optical central flexible material, adopts a state which is dependent on the pivot angle of the temples when the temple are pivoted out and becomes increasingly curved as the pivot angle increases. In the case of linear swivel axes arranged transversely to one another, the swivel axes or their imaginary extensions enclose an angle α unequal to 0° or 180° and are therefore not arranged parallel to one another.

According to yet another aspect, the present technology can include an eyewear system comprising an optical central section being a flexible material. Two temples which can be each articulated by way of a pivot connection to the optical central section which covers a field of vision in a position of use and is pivotable from a storage state, in which the temples are applied to the optical central section, into a state of use, in which the temples are folded out from the central section. The temples can be in each case articulated to the central section by way of at least one curved pivot axis of the pivot connection or in each case by way of at least two linear pivot axes of the pivot connection arranged transversely to one another. The optical central section can assume a state which is dependent on a pivot angle of the temples when the temples are pivoted out and is increasingly curved as the pivot angle increases.

In some embodiments, the optical central section by suitable selection of the pivoting axes of the pivoting connection and a bending elasticity of the optical central section, curvatures of the optical central section of varying magnitude are produced when the temples are opened.

In some embodiments, the pivot connection can be at least one bending line or bending zone.

In some embodiments, the bending elasticity for the optical central section, the bending zone and the temples, respectively, can vary by using different plastic materials or different material thicknesses.

In some embodiments, the pivot connection can be a film hinge. The film hinge can have two parallel bending lines between which the film hinge forms a bead.

In some embodiments, the central section can have at least one bend which is arranged symmetrically and at right angles to an axis of symmetry running in a transverse direction of the optical central section.

In some embodiments, the temples each can have at least one stiffening bend running in the longitudinal direction of the temples, respectively.

In some embodiments, the central section can have at least one longitudinal stiffener, which is arranged symmetrically and at right angles to an axis of symmetry running in a transverse direction of the optical central section.

In some embodiments, the temples can each have at least one longitudinal stiffening running in the longitudinal direction of the temples, respectively.

In some embodiments, the temples can each have a recess for receiving the respective other temple in the storage state.

In some embodiments, the optical central section can project beyond the temples, respectively.

In some embodiments, the temples, respectively, can project beyond the optical central section.

In some embodiments, the temples and/or the optical central section can have an elastic seal in a region of the pivot connection.

In some embodiments, the pivoting connection can be designed as a bending zone, which connects the optical central section to the respective temple, the temples, respectively, having at least one section made of a material with a lower bending elasticity than the bending zone.

This design has the effect that the optical central section, which is made of a flexible material, takes on a state which is dependent on the swing angle of the temples and increasingly curved with increasing swing angle when the temples are swung out. The more rigid the flexible material of the optical central section is, the greater the curvature of the swivel axis or the inclination of at least two straight swivel axes relative to each other, and the greater the swivel angle, the greater the bending force to be applied. By suitable selection of the pivoting axes and the bending elasticity of the optical central section, different degrees of curvature of the central section can be achieved when the temples are opened, which can also be so strong that the optical central section can be brought at least partially into contact with the face of the wearer with its circumferential line in the position of use. Light entering from the side, which does not cross the optical central section but nevertheless reaches the eye of the wearer, can thus be reduced as far as possible. If the size of the spectacles according to the present technology is suitable, glasses for the correction of defective vision can also be worn underneath the spectacles according to the present technology. If the spectacles are removed in order to put the temples back on the optical central section, the optical central section returns elastically to its position. The optical central section is usually frameless, and the temples are hinged directly to the optical central section and are not attached to a frame as in the conventional way, so that the bending forces exerted when the temples are swung out are transmitted directly to the optical central section and cause its curvature. The optical central section has a circumference similar to that of spectacles, which defines two viewing areas and a central nose area which is narrower than the two viewing areas. In addition, the ingenious design of the swivel axes causes the temples to exert a slight contact pressure on the wearer's temple when the spectacles are opened, since the curved optical center section exerts a force which returns the temples to their flat state and pulls them in the direction of the optical center section.

The optical central section can adopt a flat state in the storage state in order to enable particularly practical handling in the storage state and more cost-effective production. However, it may also be provided that the optical central section is pre-curved in the storage condition to ensure that the optical central section curves outwards rather than inwards as the spectacle temples swivel out and to reduce the bending force required.

According to the design, the temple and the optical center section can be made of the same flexible material, so that particularly simple and cost-effective solutions are possible. For these designs, it is recommended that the swivel connection be at least one bending line or bending zone. A bending line or bending zone can be achieved by weakening the material, for example by perforation in these areas.

The swivel connection must allow a swivel angle of the temple from 0° to at least 90°. In order to reduce material damage caused by the forces acting on the swivel joint during frequent swiveling of the temple, it is recommended that the swivel joint be at least two parallel bending lines in order to reduce the bending angle per bending line. At a swing angle of 90°, the bending angle per bending line is thus reduced to 45°, which reduces the stress on the material. If several parallel bending lines are realized, area of the swivel joint in question finally changes into a bending zone as mentioned above.

A further design form provides that the swivel connection is a film hinge. Here a material film is attached at its first end to a temple, for example glued, and at its second end to the optical central section. Preferably, the film hinge is attached to the outside of the temple and the optical center section in order to set design accents that are not affected by the optical properties of the center section. The film hinge preferably has two parallel bending lines between which the film hinge forms a bead. In this way, shear loads on the film hinge are reduced. In addition, a greater distance can be overcome without impairing the transmission of bending forces from the temple to the optical central section, as the bead has a stabilizing function.

Furthermore, it is preferably proposed that the central section should have at least one bend which is symmetrical and perpendicular to an axis of symmetry running in a transverse direction of the optical central section. The symmetry axis runs in the nose area and divides the spectacles into two symmetrical halves. The bend ensures that the optical central section curves outwards and not inwards when the temples are opened. In addition, such a bend stiffens the optical central section, especially in the narrow nasal region. Alternatively, it may be provided that the central section has at least one longitudinal stiffening arranged symmetrically and at right angles to an axis of symmetry extending in a transverse direction of the optical central section. Furthermore, it may also be provided that the temples each have at least one longitudinal stiffening running in the longitudinal direction of the temple.

Preferably, the temples also have at least one stiffening bend running in the longitudinal direction of the hanger in order to stiffen the hangers in each case.

Since the temples are usually longer than the extension of the optical central section between the temples, it is also suggested that the temples each have a recess to accommodate the other temple in the storage condition. The spectacle temples can thus be brought into contact with the optical central section in the storage condition in a flat configuration.

Furthermore, it has been shown to be advantageous if the optical central section protrudes slightly beyond the temple, or if the temple protrudes slightly beyond the optical central section. In addition, it is possible that the temple and/or the optical center section may have an elastic seal in area of the swivel connection.

In addition, it is proposed that the swivel joint be designed as a bending zone connecting the optical central section to the respective temple, the temple having at least a portion of a material with lower bending elasticity than the bending zone. This variation of the bending elasticity can be achieved by using different plastic materials for the optical central section, the bending zone and the bow, or by using different material thicknesses.

BRIEF DESCRIPTION OF THE DRAWINGS

The present technology will be explained in more detail below using examples of execution with the help of the enclosed figures. Such description makes reference to annexed drawings wherein:

FIGS. 6a-c is a front diagram explaining the dependence of the curvature on the inclination of the swivel axles to each other (FIGS. 6a and 6b) and on the swivel angle of the temples (FIG. 6c), FIG. 7 is a rear view of a design of the present technology spectacles, each with three rectilinear swivel axes arranged transversely to each other, FIG. 8 is a rear view of a design of the spectacles according to the present technology, each with a curved swivel axis, FIG. 9 is an exploded side perspective view of three different versions of a spectacle temple for spectacles according to the present technology, FIG. 21a is a perspective representation of a further design form of the present technology spectacles with temples, which each having a recess for receiving the respective other temple, wherein the right temple in FIG. 21a is partially folded in, FIG. 21b is a perspective view of the design of FIG. 21a, whereby the right temple in FIG. 21a is completely folded in.

DETAILED DESCRIPTION OF THE PRESENT TECHNOLOGY

Figure 1:
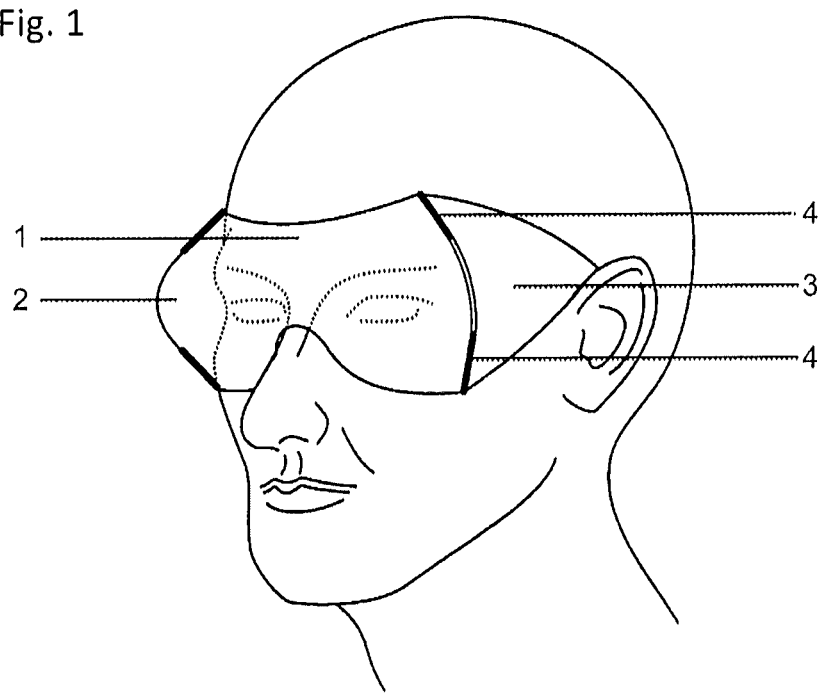
FIG. 1 is a perspective view of a design of the present technology spectacles in the position of use.
Figure 2:
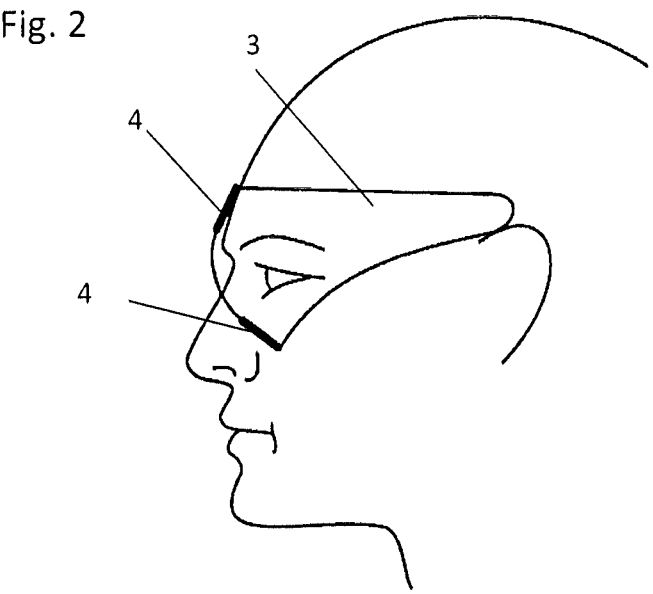
FIG. 2 is a side view of a version of the present technology spectacles in the position of use.
Figure 3A:
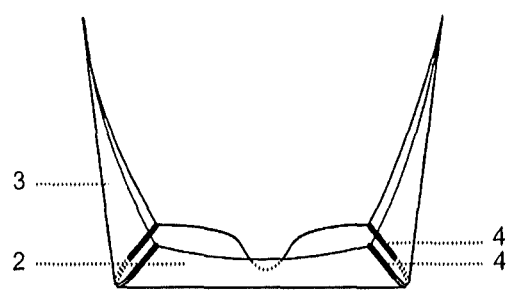
FIG. 3a is a top view of a design of the spectacles according to the present technology with the temples swung out seen from above.
Figure 3B:
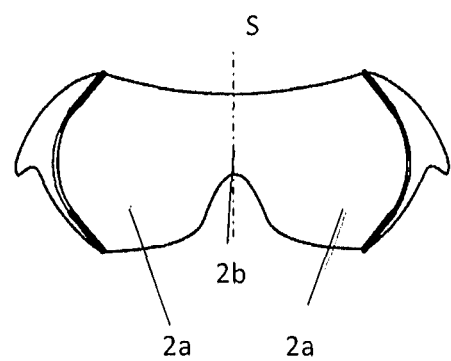
FIG. 3b is a front view of a design of the spectacles according to the present technology with the temples swung out seen from the front.
Figure 3C:
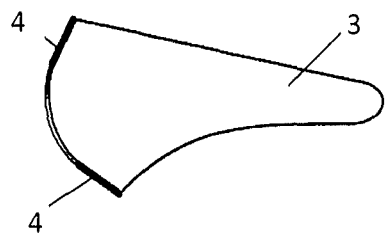
FIG. 3c is a side view of a design of the spectacles according to the present technology with the temples swung out seen from the side.

First, reference is made to FIGS. 1 and 2, which show a version of the present technology spectacles 1 in the position of use in different views. Spectacle 1 has an optical central section 2 and two temples 3, each of which is hinged to the optical central section 2 via swivel connections 4. In the enclosed figures, the swivel connections 4 are shown in thick lines. In the position of use according to FIGS. 1 and 2, the optical central section 2 is in a curved state which spans the field of vision of the wearer, whereby the circumferential line of the optical central section 2 can be brought at least partially into contact with the face of the wearer in order to avoid as far as possible laterally entering light which does not cross the optical central section 2 but nevertheless reaches the eye of the wearer. FIG. 3 shows a view of an execution form of the present technology spectacles with swiveled out temples 3 seen from above (FIG. 3a), seen from the front (FIG. 3b) and seen from the side (FIG. 3c). In particular, it can be seen that the optical central section 2 has an approximately cylindrical curvature when in use, the generatrices of which run perpendicularly to axis of symmetry S. The optical central section (FIG. 3b) is also visible from the side (FIG. 3c).

The optical central section 2 is usually frameless, and the temples 3 are hinged directly to the optical center section 2 and not to a frame as is conventionally the case, so that the bending forces exerted in the course of swiveling out the temples 3 are transmitted directly to the optical center section 2 and cause its curvature. For this purpose, the optical central section 2 has a circumferential line similar to spectacles which defines two viewing areas 2a and a central nose area 2b which is narrower than the two viewing areas 2a (FIG. 3b). The optical central section 2 as well as the temples 3 are made of a flexible material, preferably a synthetic material with the required optical properties.

Figure 4:
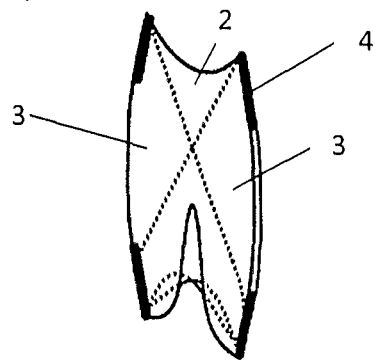
FIG. 4 is a perspective view of a design of the spectacles according to the present technology with the temples swung in in the storage condition.

When in storage, the temples 3 can be attached to the optical central section 2, as shown in FIG. 4. In the design shown, the optical central section 2 assumes a flat state in the storage state, which makes practical handling much easier due to the flat construction and thus compact storage as well as production.

Figure 5:
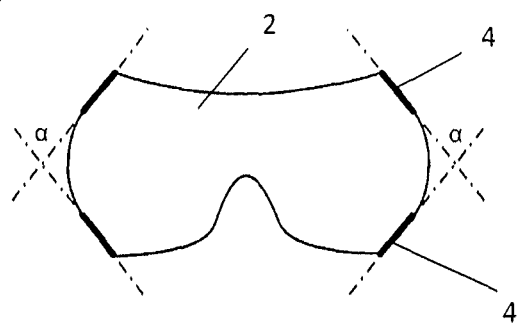
FIG. 5 is a front view of a design of the present technology spectacles, each with two rectilinear swivel axes arranged transversely to each other.

On the basis of FIGS. 5 to 8, different geometric realizations of the swivel connections 4 are explained in order to achieve the desired curvature of the optical central section 2 in the course of swiveling out the temples 3. In the case of straight swivel axes of the swivel connections 4 arranged transversely to each other, the swivel axes or their imaginary extensions enclose an angle α unequal to 0° or 180° and are therefore not arranged parallel to each other (FIG. 5). This design has the effect that the optical central section 2, which is made of a flexible material, adopts a state which is dependent on the swivel angle of the temples 3 when the temples 3 are swung out and which becomes increasingly curved as the swivel angle increases. The greater the inclination of at least two rectilinear pivot axes to one another, as can be seen from a comparison of FIGS. 6a and 6b, and the greater the pivoting angle of the temple 3, as indicated by FIG. 6c, the greater the curvature achieved. By suitable selection of the swivel axes and the bending elasticity of the optical central section 2, different degrees of curvature of the central section 2 can be achieved when the temples 3 are opened.

In doing so, it is also possible to realize designs of the present technology spectacles 1, each with three linear swivel axes of the swivel connection 4 arranged transversely to each other, as shown in FIG. 7. If an even higher number of swivel connections 4 is actually or imaginarily selected, a configuration as shown in FIG. 8 can finally be achieved in which the two temples 3 are each hinged to the swivel connection 4 on the center section 2 via a curved swivel axis, which can also be designed to be continuous.

FIG. 9 shows three different versions of a temple 3 for a present technology spectacle 1, whereby it is also evident how, for example, the two swivel axes of a swivel connection 4 of a temple 3 to the central section 2 of FIG. 3 can be assigned to a temple 3. The temple 3 can be designed in one piece with the optical central section 2, or as a separate and therefore exchangeable part. In the latter case, it would be possible, for example, to exchange central sections 2 for different face shapes or also temple 3 for different head shapes.

Figure 10:
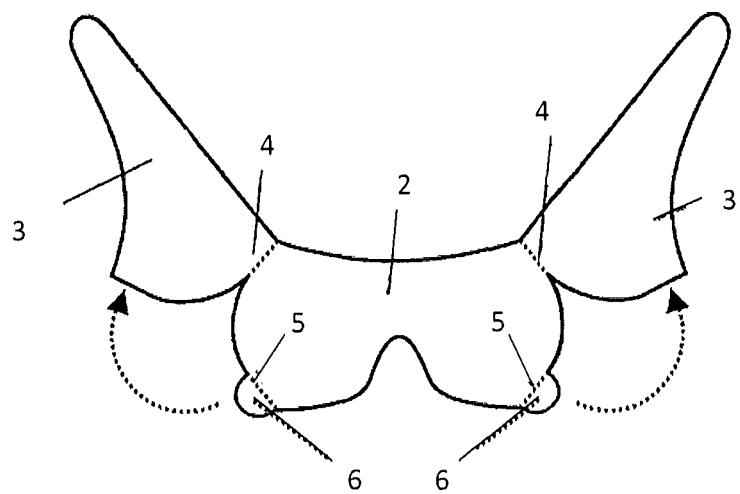
FIG. 10 is a front view of a one-piece design of the spectacles according to the present technology.

FIG. 10 shows a one-piece version of the present technology spectacles 1, in which the two temples 3 are hinged to the upper part of the optical central section 2 via bending lines 5. This bending line 5 can be achieved by weakening the material, for example by perforating in this area.

In the lower areas of the central section 2, adhesive flaps 6 are formed, which can be attached to the temples 3, as indicated by arrows in FIG. 10. The adhesive flaps 6 also have bending lines 5. After attaching adhesive flaps 6 to the respective temple 3, a tension-free state can only be assumed when the temples 3 are in contact with the optical central section 2 when the temples 3 are in the storage state. As soon as the temples 3 are moved away from the central section 2, i.e. swung out, the central section 2 is put into a state of tension which causes an increasing curvature of the central section 2. Admittedly, adhesive flaps 6 could also be provided on the respective temple 3, which in this case can be glued to the lower area of the central section 2.

Figure 11:
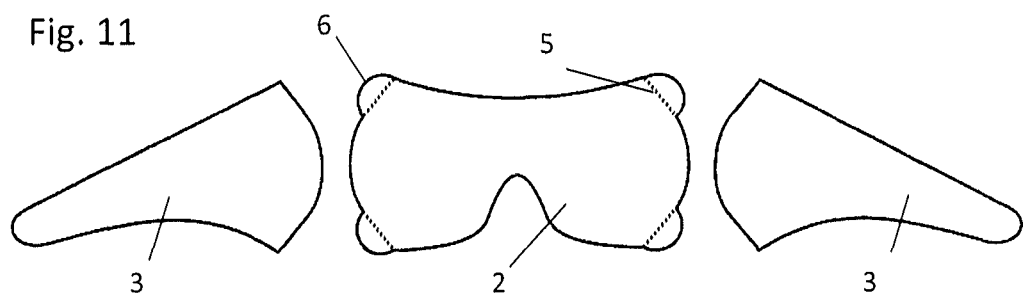
FIG. 11 is an exploded front view of a three-part design of the spectacles according to the present technology.

In contrast to FIG. 10, FIG. 11 shows a three-part design in which the optical central section 2 and the two temples 3 are each designed as separate parts. The adhesive flaps 6 are formed in the upper and lower areas of the central section 2 and can be attached to the temples 3, for example by gluing. The adhesive flaps 6 in turn have bending lines 5.

Figure 12:
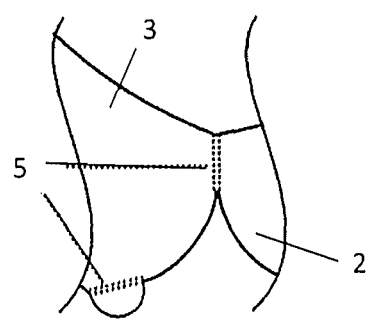
FIG. 12 is an enlarged detailed view of a swivel connection of a temple to the optical central section with two parallel bending lines.
Figure 13:
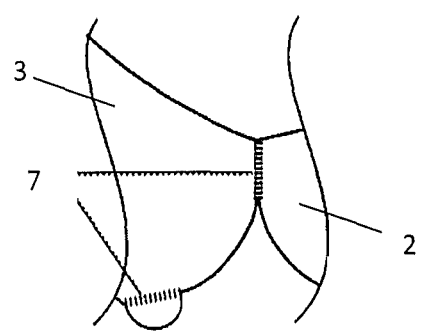
FIG. 13 is an enlarged detailed view of a swivel connection of a temple to the optical central part with a bending zone.

As already mentioned, the swivel connections 4 of the temples must allow 3 swivel angles from 0° to at least 90°. In order to reduce material damage caused by the forces acting on the swivel connection 4 during frequent swiveling of the temples 3, it can be provided that the swivel connection 4 is at least two parallel bending lines 5, as shown in FIG. 12. This measure reduces the bending angle per bending line 5. At a swing angle of 90°, the bending angle per bending line 5 is thus reduced to 45°, whereby the stress on the material can be reduced. If several parallel bending lines 5 are realized, area of the respective swivel connection 4 finally merges into a bending zone 7, as indicated in FIG. 13.

Figure 14:
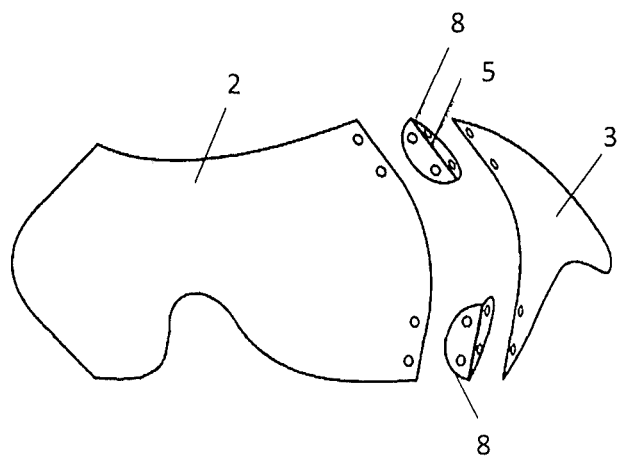
FIG. 14 is an exploded front perspective view of a representation of a design of the swivel connection via a hinge, FIGS. 15 a-c is a perspective view of a representation of a further design of the swivel connection via a hinge in the unconnected state (FIG. 15a), in the inserted state (FIG. 15b) and in a state corresponding to the storage state of the spectacles (FIG. 15c), FIGS. 16 a-b is a top view of a representation of a further design form of the pivot connection via a film hinge in a state corresponding to the storage state (FIG. 16a) and an open state (FIG. 16b)
Figure 15A:
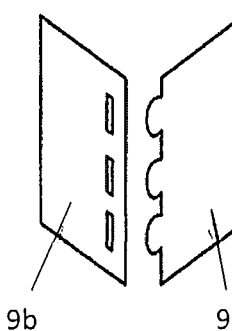
Figure 15B:
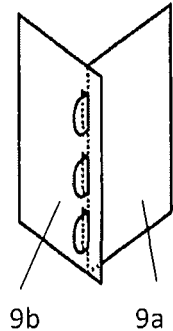
Figure 15C:
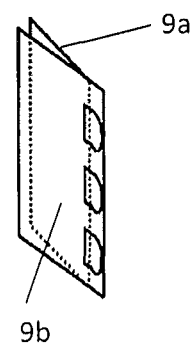

FIG. 14 shows the first version of a film hinge 8. Here a material film is attached at its first end to a temple 3, e.g. inserted, riveted or glued, and at its second end to the optical central section 2. The film hinges 8 of FIG. 14 each have a bending line 5. In contrast, FIG. 15 shows a hinge 9, in which a first hinge part 9a, for example, fastened to the temple 3, has lugs and a second hinge part 9b, for example, fastened to the central section 2, has hinge slots (FIG. 15a) into which the lugs of the first hinge part 9a can be inserted (FIG. 15b). The lugs are dimensioned in such a way that they must overcome a resistance if they are inserted into the respective hinge slots assigned to them, so that the swivel connection 4 formed in this way cannot release itself again. However, the hinge slots are still wide enough so that the two hinge parts 9a, 9b can lie very flat against each other in the storage condition (FIG. 15c).

Figure 16A:
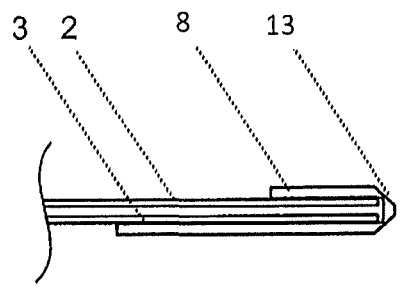
Figure 16B:
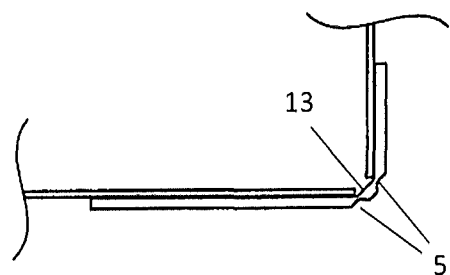
Figure 17A:
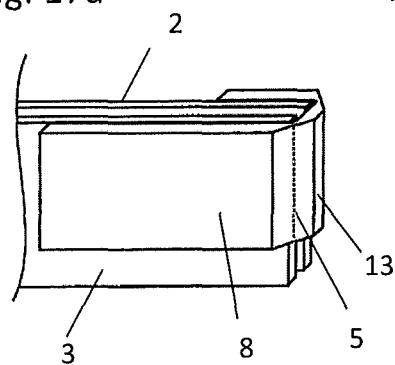
FIG. 17a is a perspective view of the design according to FIG. 16a in perspective view.
Figure 17B:
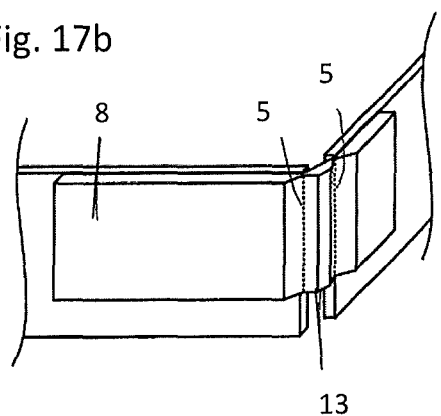
FIG. 17b is a perspective view of the design according to FIG. 16b in perspective view.

FIGS. 16 and 17 show another version of a film hinge 8 with two parallel bending lines 5 between which the film hinge 8 forms a bead 13. In this way, shear stresses on the film hinge 8 are reduced. In addition, a greater distance can be overcome without impairing the transmission of bending forces from the temple 3 to the optical central section 2, since the bead 13 has a stabilizing function. Preferably, the film hinge 8 is attached to the outer sides of temple 3 and optical central section 2 in order to set design accents that are not affected by the optical properties of the central section 2.

Figure 18:
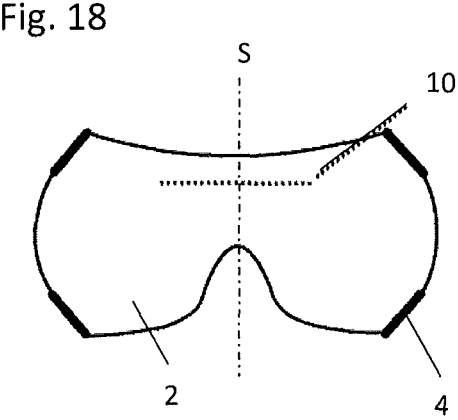
FIG. 18 is a front view of a representation of a further version of the present technology spectacles with a bend in the central section.

According to a further design, it can be provided that the central section 2 has a bend 10, as shown in FIG. 18 by the dotted line. If this bend 10 is suitable, it can be ensured that the optical central section 2 curves outwards and not inwards when the temples 3 are opened. In addition, such a bend 10 stiffens the optical central section 2, especially in the narrower nose area 2b.

Figure 19:
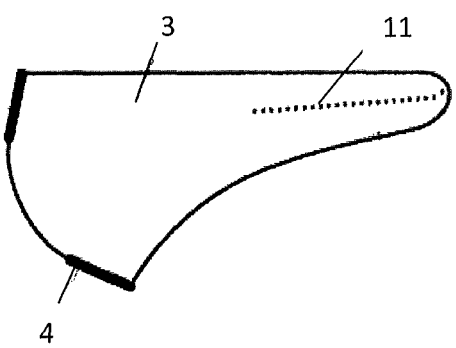
FIG. 19 is a side view of a representation of a further design of the present technology spectacles with a bend running in the longitudinal direction of the temple.

FIG. 19 shows that the temples 3 can also each have a stiffening bend 11 running in the longitudinal direction of the temple 3 in order to stiffen the temples 3 in each case. This measure proves to be very advantageous in particular when using a flexible material for the temples 3.

Figure 30A:
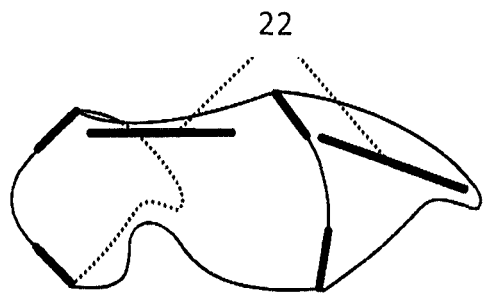
Figure 30B:
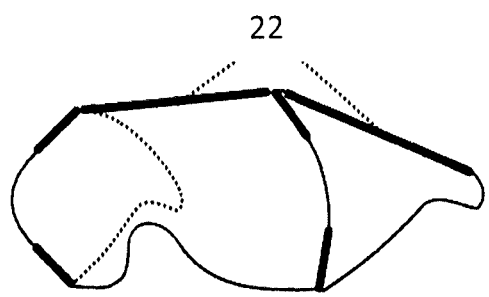

In a further design, instead of a bend 10 or stiffening bend 11, longitudinal stiffeners 22 are arranged on or embedded in the central section 2 or bow 3 instead of a bend 10 or stiffening bend 11 for stiffening the optical central section 2 or bow 3, as shown in FIGS. 30a,b. These longitudinal stiffeners 22 can, for example, be designed as rigid longitudinal elements, such as metal rods or the like. In a further design, instead of a bend 10 or a stiffening bend 11, thickened areas 23 are produced in these elements to stiffen the optical central section 2 or the temple 3, as shown in FIGS. 31 a,b.

Figure 20:
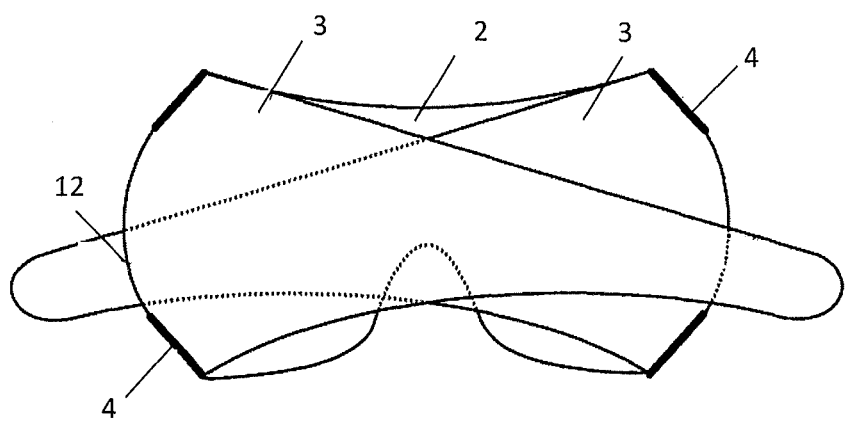
FIG. 20 is a rear view of a representation of a further design of the present technology spectacles with a slot provided between the temple and the central section to accommodate the other temple.

FIG. 20 shows that a slot 12 can be provided between the temple 3 and the central section 2 to accommodate the other temple 3 in the storage state, since the temples 3 are usually longer than the extension of the optical central section 2 between the temples 3 and the temples 3 can thus be brought into contact with the optical central section 2 in the storage state in the flat configuration. Since the temples 3 are longer than the optical central section 2 to give sufficient support in the ear area, they must be bent sometimes strongly when folding the spectacles to be able to be inserted through the slot 12. If the material of the temples 3 is thicker, this process can place a heavy load on the material in the bending area.

Figure 21A:
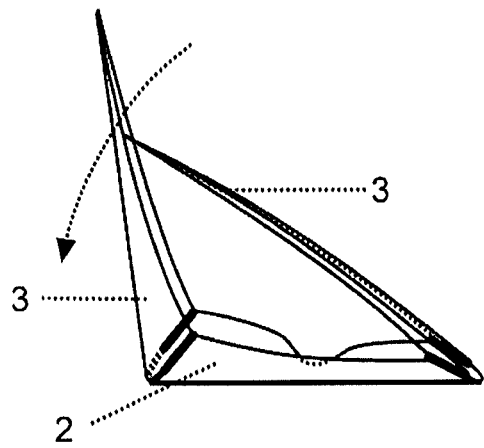
Figure 21B:
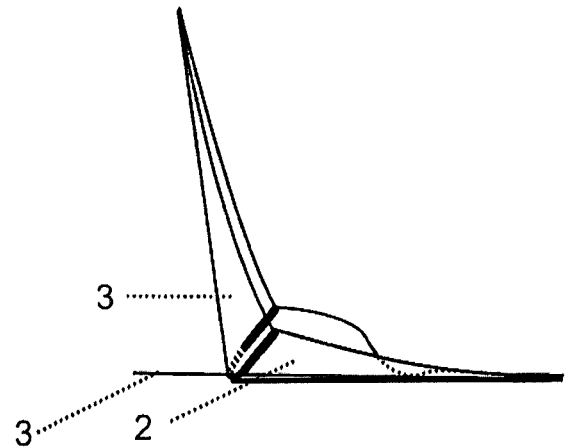

FIGS. 21a,b and 22a-c therefore show types in which the two temples 3 each have a recess 14 for receiving the respective other temple 3 in the storage state, so that when the spectacles (see FIG. 21) are folded together, the first temple 3 which is folded in can be folded through the recess 14 of the opposite temple 3 onto the optical central section 2 without having to bend the temple 3 in the process.

Figure 22A:
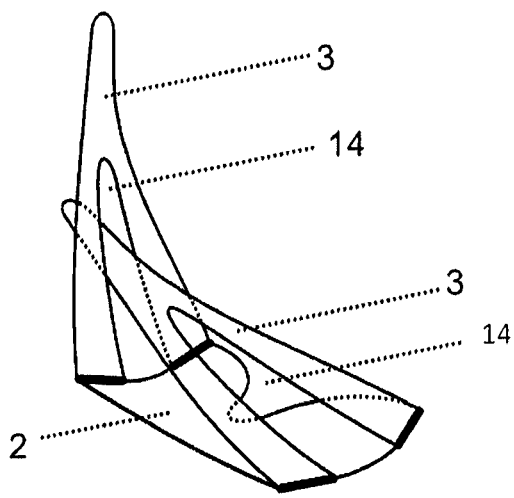
FIG. 22a is a perspective view of a first type of recess for the present technology spectacles according to FIG. 21.
Figure 22B:
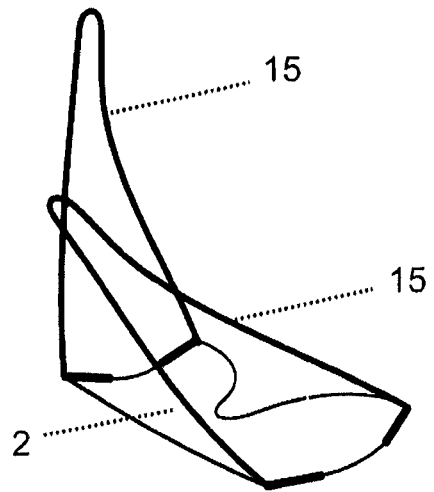
FIG. 22b is a perspective view of a second design of the recess for the present technology spectacles according to FIG. 21.

FIG. 22b shows a design in which the temples 3 are formed by metal temples 15, for example a suitable wire, so that each temple 3 can naturally be folded through the open area of the opposite temple 3.

Figure 22C:
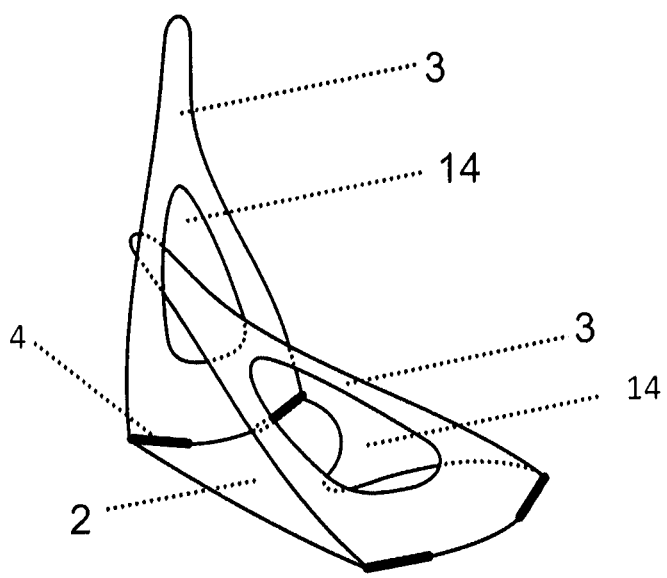
FIG. 22c is a perspective view of a third design of the recess for the present technology spectacles according to FIG. 21.

FIG. 22c shows a design in which the recess 14 in the temple 3 does not extend to the swivel connection 4, so that in area of the swivel connection 4 protection against light, wind, chips (when used as safety spectacles), etc. remains on the one hand, but on the other hand the temple 3 can still be rigid in the longitudinal direction, as they can also dive through this now smaller recess 14 without having to be bent, folded or pushed in in the longitudinal direction.

In order to prevent the penetration of foreign objects or light through a gap 16 formed between the temple 3 and the optical central section 2, several design forms are given below as examples.

Figure 23A:
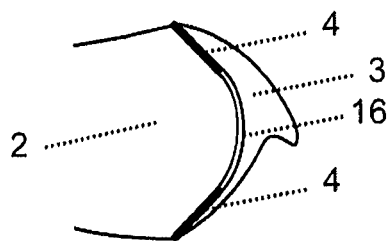
FIG. 23a is a top view of another version of spectacles according to the present technology with partially open gap between temple and optical central section.

FIG. 23a shows a design in which the gap 16 between temple 3 and optical central section 2 is still unprotected.

Figure 23B:
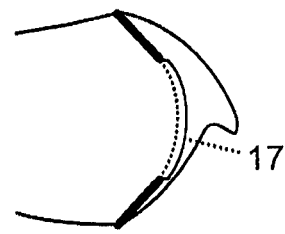
FIG. 23b is a top view of another version of spectacles according to the present technology, in which the optical central section protrudes slightly beyond the temple.

FIG. 23b, on the other hand, shows a design in which the optical central section 2 projects beyond the temple 3 in area between the swivel connections 4, and this overlap 17 prevents the frontal penetration of foreign objects and light.

Figure 23C:
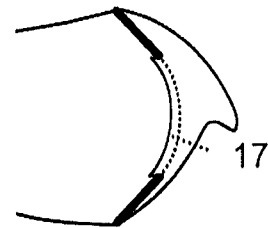
FIG. 23c is a top view of another version of the present technology spectacles in which the temple protrudes slightly beyond the optical central section.

FIG. 23c shows a design in which the temple 3 projects beyond the optical central section 2 in area between the swivel connections 4 and this overlap 17 prevents the lateral penetration of foreign objects and light.

A further possibility to prevent the penetration of foreign objects or light through a gap 16 formed between the temple 3 and the optical central section 2 is shown in FIGS. 24a-d.

Figure 24A:
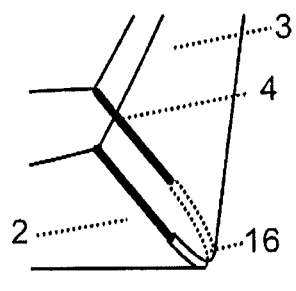
FIG. 24a is a perspective view of another version of the present technology spectacles with a partially open gap between the temple and the optical central section.

FIG. 24a shows a design in which the gap 16 between temple 3 and optical central section 2 is still unprotected.

Figure 24B:
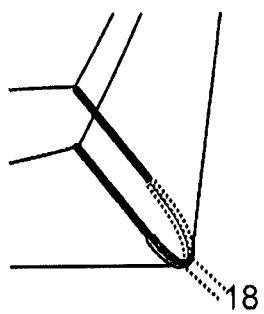
FIG. 24b is a perspective view of a further design of a spectacle in accordance with the present technology, in which the temple and the optical central section have elastic seals in the region of the swivel connection.

FIG. 24b, on the other hand, shows a design in which the optical central section 2 and the temple 3 have elastic seals 18 in area between the swivel connections 4, which prevent the penetration of foreign objects and light.

Figure 24C:
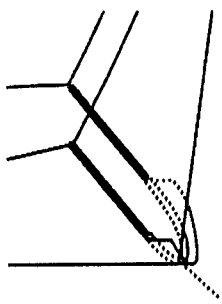
FIG. 24c is a perspective view of a further design of a spectacle according to the present technology, in which the temple has an elastic seal in the region of the swivel connection.

FIG. 24c shows a design in which the temple 3 has an elastic seal 18 in area between the swivel connections 4, which prevents the penetration of foreign objects and light.

Figure 24D:
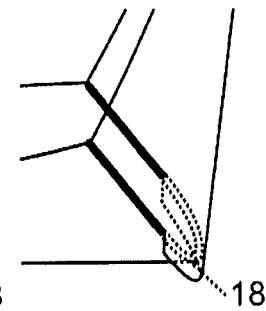
FIG. 24d is a perspective view of a further design form of a spectacle according to the present technology, in which the optical central section has an elastic seal in the region of the pivot connection.

FIG. 24d shows a design in which the optical central section 2 has an elastic seal 18 in area between the swivel connections 4, which prevents the penetration of foreign objects and light.

Of course, above mentioned sealing options can also be used in mixed forms, or other sealing options can be used, which are not explicitly described here.

The stability or rigidity of the spectacles according to the present technology during use is given by the curvature of the optical central section 2 and temple 3. However, if the material of the temple 3 in the ear area becomes so narrow that there is no satisfactory curvature, this area can bend away from the head and endanger the hold of the spectacles.

Figure 25:
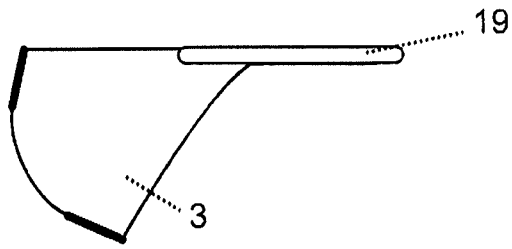
FIG. 25 is a side view of another design of the present technology spectacles in which the end closer to the ear is formed by a rigid element projecting into the flexible part of the temple, FIGS. 26a,b is a side view of the folding of the temple with spectacles according to the present technology, FIGS. 27a,b is a side view of another design of the present technology spectacles with a two-part temple, FIGS. 28a,b is a side view of a further design form of a spectacle according to the present technology, in which the temples are formed in the front part by a flexible material and in the rear part by an arched metal temple, FIGS. 29a,b is a side view of another design of spectacles conforming to the present technology with elastic retaining strap, FIGS. 30a,b is a front perspective view of another design of a spectacle according to the present technology with rigid longitudinal stiffeners attached to or embedded in the central section or temple, FIGS. 31a,b is a front perspective view of a further design of spectacles conforming to the present technology with thickened areas on the central section or temple, and the FIG. 32 is a front perspective view of a representation of a further design of the present technology pair of spectacles with rigid two-part temples connected by a joint at the ends of the ear.

FIG. 25 therefore shows a design of the temple 3 in which the end closer to the ear is formed by a rigid element 19 which projects into the flexible area of the temple 3 and ensures a stable hold on the head after unfolding the spectacles.

In order to avoid the necessary insertion of the temples 3 into the opposite slot 12 or into the opposite recess 14 when folding the spectacles, three further designs are given below.

Figure 26A:
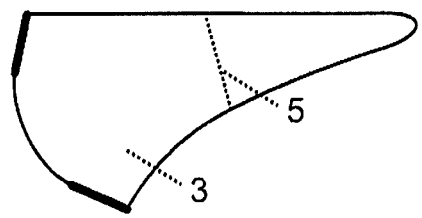
Figure 26B:
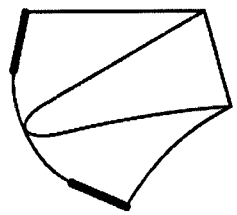

FIGS. 26a,b show the simple folding of a bow 3 along a bending line 5. This is possible if the bow material is thin. If the spectacles are opened and the folded part of the temple 3 is also opened, it assumes a cylindrical curvature and can no longer bend away from the head.

Figure 27A:
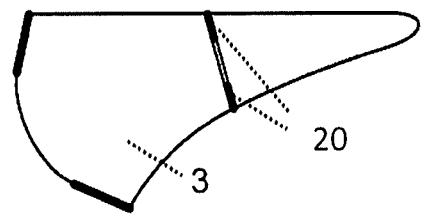
Figure 27B:
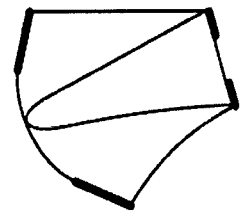

FIGS. 27a,b show two-part temple 3. The two temple parts of a temple 3 are connected to each other by a joint 20, similar to the connection between the optical central section 2 and temple 3, but here the swivel axes of the joint 20 are in line.

Figure 28A:
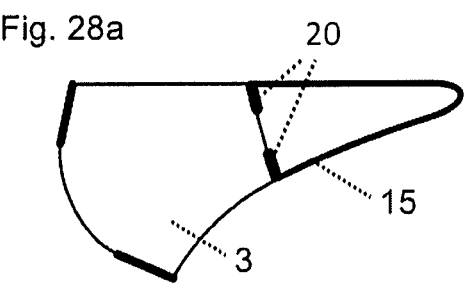
Figure 28B:
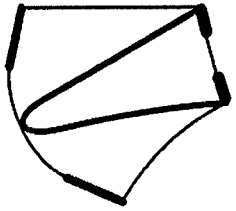

FIGS. 28a,b show an embodiment in which the temples 3 are formed in their region close to the optical central section 2 by an elastic material, and in their region remote from the optical central section 2 by an arcuately formed metal temple 15.

Figure 29A:
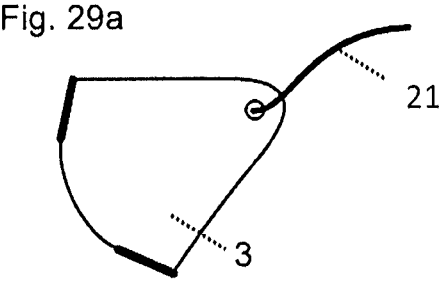
Figure 29B:
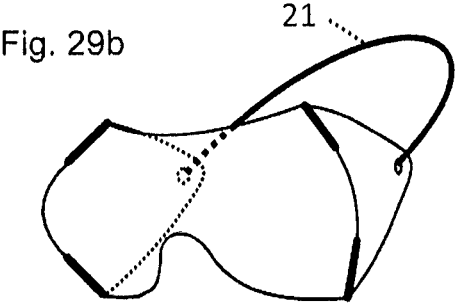

FIGS. 29 a,b, show a design in which the temples 3 in their area close to the optical central section 2 are only designed for as long as is necessary to prevent the lateral penetration of foreign bodies or light. To ensure that the spectacles can be held sufficiently on the head despite such short temple parts, an elastic band 21 is provided which connects the left and right temples 3 and is pulled over the back of the head when the spectacles are worn. This ensures that the spectacles are able to safely protect the eye area even in violent movements, in the wind, etc. The spectacles can be worn in a wide range of positions.

FIGS. 30a,b shows representations of a further design of a pair of spectacles in accordance with the present technology, the central part 2 having at least one longitudinal stiffening 22 which is arranged symmetrically and at right angles to an axis of symmetry extending in a transverse direction of the optical central part 2. Furthermore, it may also be provided that the temples 3 each have at least one longitudinal stiffening 22 running in the longitudinal direction of the temple 3.

Figure 31A:
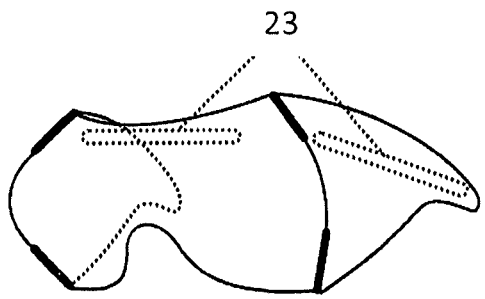
Figure 31B:
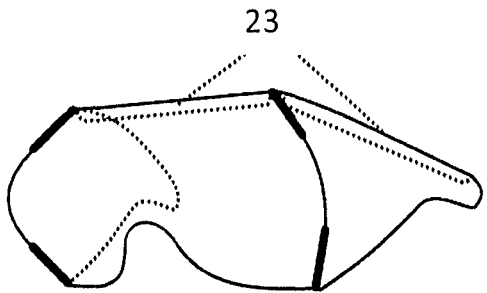

FIGS. 31a,b shows representations of a further design of the present technology spectacle with thickened areas 23 on the middle part 2 or temple 3.

Figure 32:
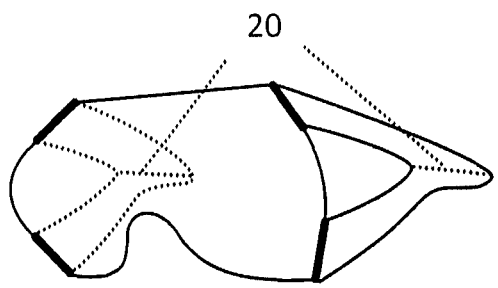

FIG. 32 shows an illustration of another design of the present technology spectacles with rigid temples 3 divided in two along their longitudinal direction, which are connected at the ends of the ear by a joint 20. In contrast to one-piece temples 3 made of flexible material, the rigid temples 3 of FIG. 32 do not build up any tension. The resetting tension of the spectacles is generated exclusively by the optical central section 2.

In this way, spectacles 1 can be achieved in which, in the position of use, light entering laterally, which does not cross the optical central section 2 but nevertheless reaches the eye of the wearer, is prevented as far as possible. The spectacles 1 are practical to handle because they can be stored flat or with little pre-curvature and are therefore easy to stow away. The present technology spectacles can also be produced inexpensively.

REFERENCE CHARACTER LIST

1 Spectacles
2 Optical central section
3 Temples
4 Swivel connection
5 Bending line
6 Glue flap
7 Bending zone
8 Film hinge
9a First hinge part
9b second hinge part
10 Bend
11 Stiffening bend
12 Slot
13 Bead
14 Recess
15 Metal temple
16 Gap
17 Overlap
18 Elastic seals
19 Rigid element
20 Joint
21 Elastic band
22 Longitudinal bracings
23 Thickened areas

The invention claimed is:

1. Spectacles comprising:
two temples which are each articulated by way of a pivot connection to an optical central section which covers a field of vision in a position of use and is pivotable from a storage state, in which the temples are applied to the optical central section, into a state of use, in which the temples are folded out from the central section;
wherein the optical central section being a flexible material;
wherein the temples are in each case articulated to the central section by way of at least one curved pivot axis of the pivot connection or in each case by way of at least two linear pivot axes of the pivot connection arranged transversely to one another;
wherein the optical central section assuming a state which is dependent on a pivot angle of the temples when the temples are pivoted out and is increasingly curved as the pivot angle increases.

2. The spectacles according to claim 1, wherein the optical central section is provided with a pre-curvature in the storage state.

3. The spectacles according to claim 2, wherein the pivot connection is at least one bending line or bending zone.

4. The spectacles according to claim 3, wherein the pivot connection includes at least two parallel bending lines.

5. The spectacles according to claim 1, wherein the pivot connection is a film hinge.

6. The spectacles according to claim 5, wherein the film hinge has two parallel bending lines between which the film hinge forms a bead.

7. The spectacles according to claim 1, wherein the central section has at least one bend which is arranged symmetrically and at right angles to an axis of symmetry running in a transverse direction of the optical central section.

8. The spectacles according to claim 1, wherein the temples each have at least one stiffening bend running in a longitudinal direction of the temples, respectively.

9. The spectacles according to claim 1, wherein the central section has at least one longitudinal stiffener, which is arranged symmetrically and at right angles to an axis of symmetry running in a transverse direction of the optical central section.

10. The spectacles according to claim 1, wherein the temples each have at least one longitudinal stiffening running in a longitudinal direction of the temples, respectively.

11. The spectacles according to claim 1, wherein the temples each have a recess for receiving the respective other temple in the storage state.

12. The spectacles according to claim 1, wherein the optical central section projects beyond the temples, respectively.

13. The spectacles according to claim 1, wherein the temples, respectively, project beyond the optical central section.

14. The spectacles according to claim 1, wherein the temples and/or the optical central section has an elastic seal in a region of the pivot connection.

15. The spectacles according to claim 1, wherein the pivoting connection is designed as a bending zone, which connects the optical central section to the respective temple, the temples, respectively, having at least one section made of a material with a lower bending elasticity than the bending zone.

16. The spectacles according to claim 1, wherein the optical central section has at least one bend which is arranged symmetrically and at right angles to an axis of symmetry running in a transverse direction of the optical central section, or the temples each have at least one stiffening bend running in a longitudinal direction of the temples, respectively.

17. The spectacles according to claim 1, wherein the optical central section has at least one longitudinal stiffener that is arranged symmetrically and at right angles to an axis of symmetry running in a transverse direction of the optical central section, or the temples each have at least one longitudinal stiffening running in a longitudinal direction of the temples, respectively.

* * * * *